(12) United States Patent
Hoffknecht et al.

(10) Patent No.: US 9,379,608 B2
(45) Date of Patent: *Jun. 28, 2016

(54) COMMUNICATION SYSTEM WITH VARIABLE OUTPUT SUPPLY CURRENT

(71) Applicant: OSRAM SYLVANIA Inc., Wilmington, MA (US)

(72) Inventors: Marc Hoffknecht, Newmarket (CA); Javier Orlando Rojas, Mississauga (CA); Liam John O'Hagan, Walkerton (CA)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,872

(22) Filed: Jan. 9, 2015

(65) Prior Publication Data
US 2015/0123575 A1 May 7, 2015

Related U.S. Application Data

(63) Continuation of application No. 13/161,340, filed on Jun. 15, 2011, now abandoned, which is a continuation of application No. 13/161,314, filed on Jun. 15, 2011, now Pat. No. 8,694,817.

(51) Int. Cl.
| | |
|---|---|
| *H02M 3/156* | (2006.01) |
| *G06F 1/26* | (2006.01) |
| *H04L 12/10* | (2006.01) |
| *H04L 12/40* | (2006.01) |
| *H05B 37/02* | (2006.01) |

(52) U.S. Cl.
CPC .............. *H02M 3/156* (2013.01); *G06F 1/26* (2013.01); *H04L 12/10* (2013.01); *H04L 12/40045* (2013.01); *H05B 37/0227* (2013.01)

(58) Field of Classification Search
CPC ..... G06F 1/26; H04L 12/10; H04L 12/40045; H05B 37/0227; H02M 3/156
See application file for complete search history.

(56) References Cited

U.S. PATENT DOCUMENTS

| | | | | |
|---|---|---|---|---|
| 8,829,799 | B2 * | 9/2014 | Recker | ...... H02J 9/02 315/159 |
| 2008/0311877 | A1 * | 12/2008 | Darshan | ...... G06F 1/266 455/402 |

* cited by examiner

*Primary Examiner* — Thuan Du
(74) *Attorney, Agent, or Firm* — Shaun P. Montana

(57) ABSTRACT

A system including a bus and a plurality of devices coupled thereto and configured to communicate with each other via the bus. The system further includes a power supply coupled to the bus, to power to the plurality of devices via the bus and to detect an event, and in response, alternately supply power to the plurality of devices via the bus at a first current level or at a lesser second current level. This allows additional devices to be used on a bus, even where the total power consumption of the devices would normally exceed a maximum defined by a bus architecture. This also helps allow a single gauge of wire to be used throughout a bus network (even where long lengths of wire are required) while still providing sufficient power to the devices connected to the bus.

19 Claims, 8 Drawing Sheets

COMMUNICATION SYSTEM WITH VARIABLE OUTPUT SUPPLY CURRENT

CROSS-REFERENCE TO RELATED APPLICATIONS

The present application is a continuation of, and claims priority to, U.S. patent application Ser. No. 13/161,340, filed Jun. 15, 2011 and entitled "SYSTEM BUS WITH VARIABLE OUTPUT POWER SUPPLY", which is a continuation of, and claims priority to, U.S. patent application Ser. No. 13/161,314, now U.S. Pat. No. 8,694,817, filed Jun. 15, 2011 and entitled "BUS NETWORK", the contents of both of which are incorporated herein by reference.

BACKGROUND

Bus networks are used in a variety of fields and applications to interconnect devices and allow communication, power transmission, and other functionality. One such bus network is known as a Digital Addressable Lighting Interface (DALI), which is a bus architecture standard used in controlling devices in a building (such as sensors, lighting devices, and shades). DALI provides a two-wire bus that allows power to be supplied to, and communication between, devices on the bus. In the DALI architecture, the presence of voltage indicates a first state (i.e., a logical "1"), while the shorting of the two wires by any device on the bus indicates a second state (i.e., a logical "0"). In this manner, devices can use the two-wire DALI bus to communicate with each other.

In some bus network architectures, including DALI, the amount of power that can be supplied to devices on the bus may be limited by the architecture specification, which may in turn limit the number of devices that can be connected to the bus. In the DALI architecture, for example, power is typically supplied at 16.5V (22.5V maximum) with a current limit of 250 mA. According to the DALI specification, up to sixty-four devices can theoretically be coupled to a DALI bus, but many DALI-compatible devices can draw, for example, up to 40 mA each, effectively limiting the number of such devices that can actually be connected to the bus.

Similarly, the impedance of the bus wiring can limit the number of devices that can be connected to a bus. For example, DALI bus networks are often deployed in large buildings, requiring long lengths of wiring to be run to the devices in the building. Conventional DALI networks use lower gauge (i.e., thicker) wires as the bus gets longer, which is not only more expensive than higher gauge wire, but also increases the overall complexity of installation. Installers of such buses may have to work with multiple spools of wire, which can increase the time and cost to install a bus network.

Embodiments in this disclosure address these and other issues.

SUMMARY

Among other things, embodiments in this disclosure help allow additional devices to be used on a bus, even where the total power consumption of the devices would normally exceed a maximum defined by a bus architecture. Furthermore, various embodiments help allow a single gauge of wire to be used throughout a bus network (even where long lengths of wire are required) while still providing sufficient power to the devices connected to the bus.

A system according to various embodiments of the disclosure includes a bus and a plurality of devices coupled to the bus, the devices configured to communicate with each other via the bus. The system further includes a power supply coupled to the bus, the power supply for supplying power to the plurality of devices via the bus. The power supply is configured to detect an event, and in response to the event, alternately supply power to the plurality of devices via the bus at a first current level or at a second current level, the second current level less than the first current level.

It is to be understood that both the foregoing general description and the following detailed description are exemplary and explanatory only and are not restrictive of the disclosure, as claimed.

BRIEF DESCRIPTION OF THE DRAWINGS

A more complete understanding of the embodiments of the present disclosure may be derived by referring to the detailed description and claims when considered in connection with the following illustrative figures.

DETAILED DESCRIPTION

While exemplary embodiments in this disclosure are described in conjunction with the DALI bus architecture, this disclosure may be used in conjunction with any other suitable bus architecture.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In the detailed description herein, references to "an embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

Exemplary System

Figure 1:
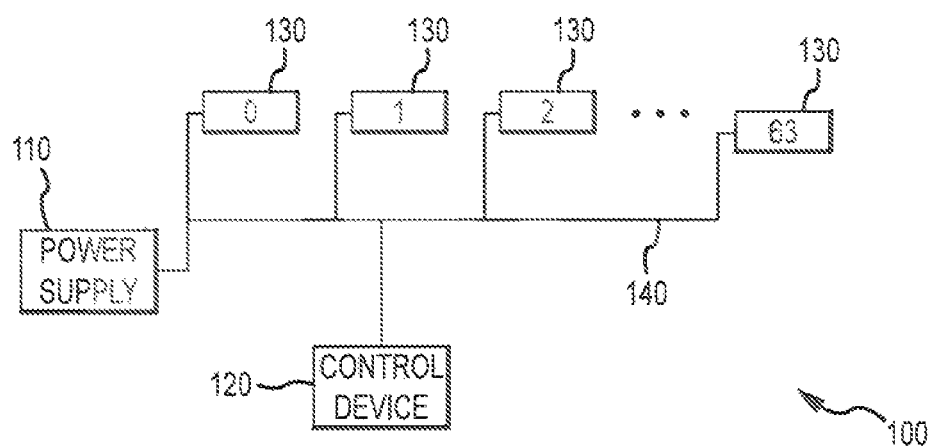
FIG. 1 illustrates an exemplary DALI bus network.

FIG. 1 illustrates an exemplary DALI bus network 100. In this example, the bus network 100 includes a power supply 110, control device 120, and a plurality of devices 130 (also referred to as "nodes") connected via a two-wire bus 140.

Power Supply 110

DALI devices can be damaged if, during communication, they attempt to short power supplied at current levels above the 250 mA limit specified in the DALI standard. In an embodiment, the power supply 110 is configured to detect an event, and, in response to the event, alternately supply power to the devices 130 at a higher or lower current level via the bus 140. The power supply 110 may be configured to alternately supply power at any number of different levels of voltage and/or current. In one exemplary embodiment, the power supply 110 is configured to provide power at a first current limit of 750 mA when devices/nodes are not communicating, and then supply power at a second current level of 250 mA to allow devices 130 on the bus 140 to communicate without damage.

The power supply 110 may be configured to supply power at varying current and/or voltage levels in response to any type of event. In this context, an "event" may include, for example, any number of measured electrical characteristics (e.g., current, voltage, impedance) as well as signals from other devices. In an embodiment, the power supply 110 may detect an event that includes a decrease in impedance for one or more of the devices 130. In DALI systems, the impedance for a device 130 on the bus 140 decreases when the device 130 shorts the bus 140 to communicate. In such cases, the power supply 110 can decrease the current level of the power supplied to the devices 130 when the impedance of a device 130 drops (indicating it is communicating) and then increase the current level of the power supplied to the devices 130 when the impedance increases (indicating the device 130 is no longer communicating).

In addition, or as an alternative, to detecting a change in impedance, the power supply 110 may be configured to detect a change in the current drawn by a device 130. In an embodiment, the power supply 110 is configured to supply power to the devices 130 on bus 140 at a decreased current level in response to detecting an increase in current drawn by one or more of the devices 130 (e.g., when the device 130 is communicating on the bus 140). The power supply 110 is further configured to supply power at an increased level upon detecting a decrease in current drawn by the device 130 (e.g., when the device 130 is no longer communicating).

The power supply 110 may be configured to supply power at varying current levels in any suitable manner. In one exemplary embodiment, the power supply 110 includes a component known as a "pass element" (such as a transistor) to increase and decrease the output voltage of the power supply 110. The pass element dissipates power according to the product of the magnitude of the voltage reduction multiplied by the current it is delivering to the bus 140, thus the lower the output voltage, the higher the dissipation. For example, if a 16.5V supply must drop down to 0.5V to limit current to 250 mA, it dissipates 4 W of power.

The power supply 110 may be configured to perform a technique called "fold-back" to dynamically change the current limit as a function of the output voltage. In an embodiment, a power supply 110 is coupled to a DALI bus network 140 and is configured to detect an increase in current drawn by a node 130 attempting to communicate (i.e., by "shorting" the bus 140). The power supply 110 lowers its output voltage in response and lowers its current limit as well. As the node 130 continues to short the bus 140, the power supply 110 further reduces the voltage. For example, the power supply 110 may be configured to provide a current of 250 mA at a voltage of 6.5V (the maximum voltage allowed by the DALI standard as a logical zero).

In some cases, the nodes 130 may briefly see a current higher than their design limit as the power supply 110 detects the event. However, the power supply 110 can be configured to quickly (i.e., within microseconds, in some cases) switch to providing power at a lowered current level, thereby preventing component damage due to sustained excessive current. The power supply 110 may be configured to supply power at an increased or decreased current level for any suitable period of time (e.g., for the duration of communication between nodes to further reduce the frequency at which the node sees brief currents above their design limit).

The power supply 110 can be configured to alter current levels over any suitable period of time. In some embodiments, for example, current levels may be switched over a relatively short (e.g., within microseconds or less) period of time. Among other things, this helps reduce the amount of time a device 130 is shorting high current levels and helps to avoid damage to the device 130 as a result.

In other embodiments, current levels may be altered over a relatively longer period of time. In one exemplary embodiment, the power supply 110 is configured to provide a dynamic current limit. Power supply 110 is configured to slowly (e.g., over about 10 mS) adjust its current limit to just above the instantaneous current. In an embodiment, if the current rapidly increases (e.g., due to a node 130 shorting the bus 140), the power supply will limit the current by lowering its output voltage for the duration of a logical zero. In an embodiment, the power supply 110 provides the steady base current to the nodes 130 but does not allow sudden increases due to a node 130 shorting the bus. This helps to protect the "shorting" node 130 from experiencing excessive current beyond its design limit and being damaged as a result.

In some embodiments, the power supply 110 may be configured to detect an event that includes a change in the rate at which current is drawn by one or more of the devices 130. The current drawn by the devices 130 can be monitored for sudden increases as an indicator that a node 130 is attempting to communicate. The DALI standard dictates that a node does not instantaneously short the current but requires the node to ramp up the current within well defined boundaries to help reduce electromagnetic emissions. Typically, an increase in current drawn by a device 130 of 250 mA within 100 us is indicative that the node 130 is attempting to communicate.

The rate of change in current draw by a device 130 can be detected by the power supply 110 in any suitable manner. In an embodiment, current from the bus 140 is fed into a high-pass filter (which removes slow changes in the current waveform) and the remaining signal (which measures fast changes) is compared against a threshold. Exceeding the threshold is indicative of a certain rate of current increase and thereby of a node 130 attempting communication. In response, the power supply 110 can switch to supplying power at a lower current level to avoid damaging the devices 130 during communication.

In an embodiment, the event detected by the power supply 110 may include receiving an indicator (e.g., from the control device 120 or one or more of the devices 130) to supply current at a particular level. Among other things, this allows the power supply 110 to quickly and/or preemptively switch from supplying current at one level to another before a device 130 shorts the bus 140 for communication, and to supply a higher current level when there is no communication between the devices 130.

Figure 2:
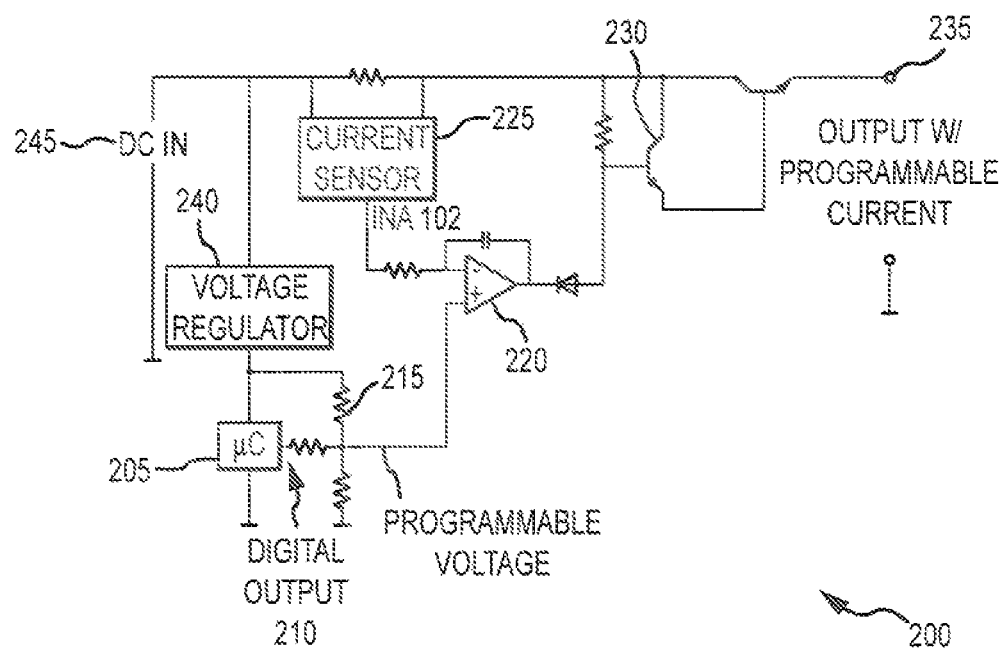
FIGS. 2 and 3 depict exemplary circuits for use in power supplies in accordance with various embodiments.

FIG. 2 illustrates an exemplary circuit for use in a power supply 110. In an embodiment, circuit 200 includes a microcontroller 205 configured to switch between two distinct current limits via digital output 210. A DC voltage is received at the input of the circuit 245 and passed through a voltage regulator 240, which helps maintain voltage output to microcontroller 205 and resister network 215 at a constant level. Resistor network 215 converts the signal from the digital output 210 into one of two distinct voltage levels, which is directed into the positive input of an operational amplifier 220. Current sensor 225 provides a signal to the negative input of the operational amplifier 220. If the actual current is higher than the limit programmed by the microcontroller 205, the output from the operational amplifier 220 drops, thereby increasing the impedance of the pass transistor 230, and in turn reducing the output current to the programmed limit at 235.

Figure 3:
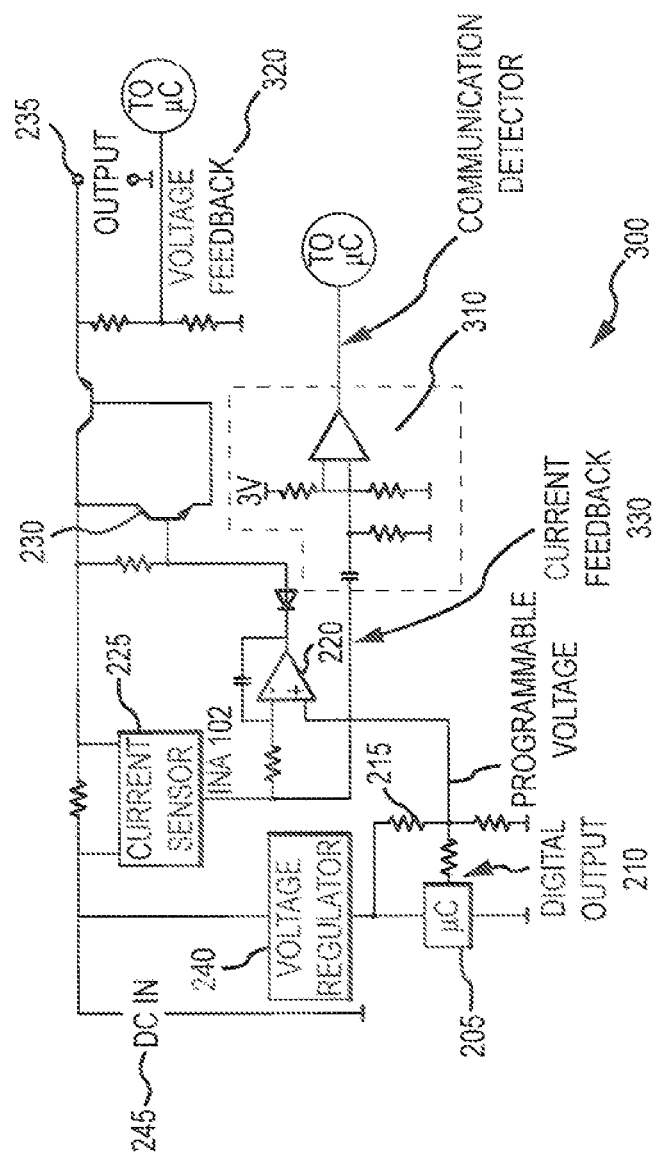

FIG. 3 depicts another exemplary circuit that may be used in conjunction with a power supply according to aspects of this disclosure. In an embodiment, circuit 300 includes the same components as circuit 200. Additionally, communication detector 310 (including a high-pass filter coupled to a comparator), voltage feedback 320, and current feedback 330 provide input to the microcontroller 205.

In addition to the functionality of circuit 200 described above, circuit 300 is configured to detect communication between nodes 130. As a node 130 attempts to communicate, the current it draws will suddenly increase. This increase is detected by the high pass filter/comparator of the communications detector 310 and signaled to the microcontroller 205. In turn, the microcontroller 205 will change the digital output 210, thereby switching the power supply from a nominal current into, for example, a relatively low current mode (such as 50 mA).

Among other things, circuit 300 helps nodes 130 communicate even when the bus impedance due to long wire lengths is relatively high. For example, as a communicating node 130 shorts the bus 140, power supply 110 switches into a low current mode and the output voltage will drop to levels that represent a logical zero. As the communicating node 130 releases the short, the output voltage will suddenly rise (although not necessarily high enough to represent a logical one). The increase in voltage is signaled to the microcontroller 205 via voltage feedback 320. In response, the microcontroller 205 will increase the current limit again, thereby returning the bus 140 to a logical one condition.

Control Device 120

In the exemplary system 100, the control device 120 can be configured to facilitate communication between devices 130, interface with the power supply 110 to control the current levels of power supplied to the bus 140, and/or perform other functionality. In an embodiment, the control device 120 may function as a bus arbiter to declare the bus free for any node 130 to commence communication (rather than instructing a specific node to respond). Any node 130 may be configured to initiate a command to any other node. In an embodiment, the control device 120 is configured to monitor communications between nodes 130, and to indicate to the power supply 110 to supply power at a particular current level. In this way, the control device 120 can preemptively instruct the power supply 110 to switch to a lower current limit before a DALI device 130 attempts to short the bus 140.

In an embodiment, control device 120 is coupled to the power supply 110, and interprets the current waveform (rather than voltages) in order to retrieve communications from devices 130. The control device 120 may be configured to take timing requirements (the known duration of individual bits) into account to filter out erroneous fluctuations in current during communication between the nodes 130. Alternatively, the current draw may be digitized and be processed further. Increases and decreases in current may be assigned probabilities of being a positive or negative transition and the probability of successive transitions collectively make up the probability of a particular bit sequence. Possible bit sequences may be processed in parallel and the highest probability path shall win. In this manner, the control device 120 may operate in conjunction with the power supply 110 to allow the control device 120 to receive responses from nodes 130 despite high wiring impedance.

Devices 130

Figure 4:
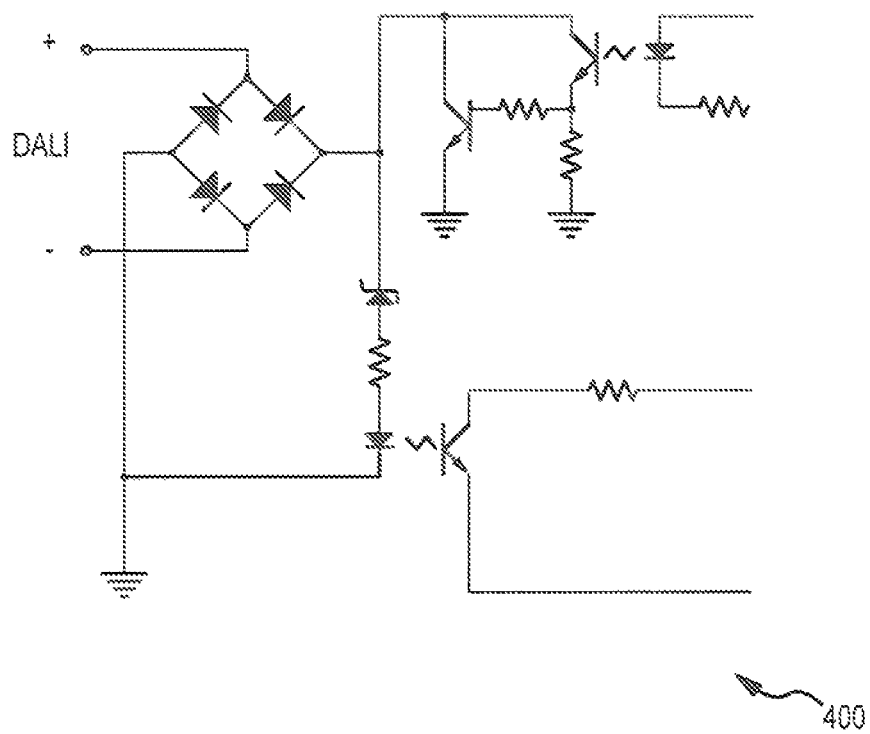
FIG. 4 illustrates the input stage of a conventional DALI device.

Devices 130 (or "nodes") receive power and communicate via the bus 140. Embodiments of this disclosure may operate in conjunction with any number and type of different devices on a bus. In the exemplary embodiment of the DALI bus network 100 depicted in FIG. 1, the devices 130 may include any type of DALI-compatible device, such as lighting devices, sensors, and/or shades. A typical input stage of a conventional DALI device is shown in FIG. 4. In this configuration, input stage 400 provides optical isolation between the communication bus 140 and peripheral functions of device 130. In particular, power to device 130 is not obtained from communication bus 140.

Figure 5:
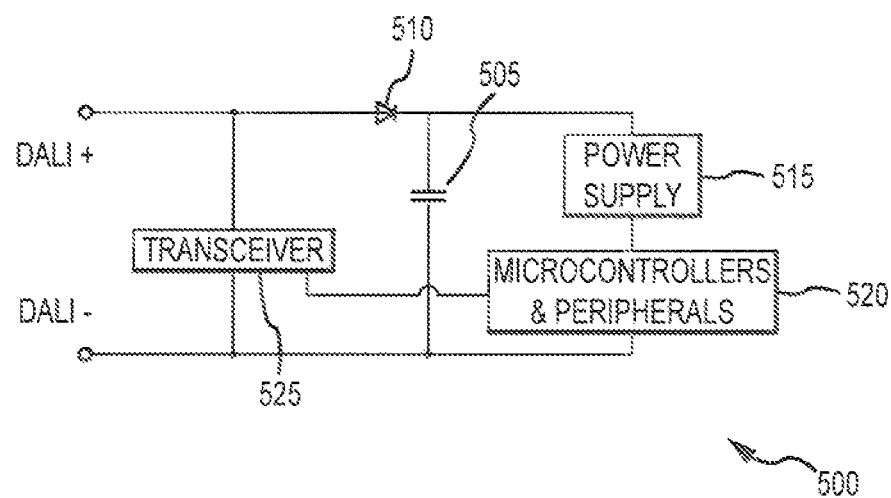
FIG. 5 illustrates an exemplary input stage for a DALI device in accordance with various embodiments.

FIG. 5 depicts an exemplary embodiment of a DALI node 500 in accordance with various aspects of this disclosure. In an embodiment, node 500 comprises an input stage that includes a capacitor 505 (or other energy storage device) and a rectifier 510. The rectifier 510 prevents current from flowing out of the storage device 505 back onto the bus 140, and therefore the node will only consume current if the bus voltage is higher than the voltage in the storage device 505. In other words, the capacitor 505 can be charged up to the nominal voltage of the bus 140 during periods of a logical one, and deplete somewhat during periods of logical zeros. Typically, the node 500 will consume no current once the bus voltage drops a few volts below the typical bus voltage. For example, the bus voltage may usually be 16.5V (that is, during the logical one). Below 15V, the node may consume no current, depending on the configuration of the capacitor 505 and other factors. Power supply 515 regulates the voltage of capacitor 505 to provide a constant supply voltage to the microcontroller and peripherals 520 of node 500. Peripherals may include circuitry to create a dimming signal to an external ballast. Transceiver 525 is coupled to the communication bus in front of rectifier 510 such that it is not subject to the signal filtering introduced by capacitor 505.

During a logical one, the power supply 110 may output a nominal voltage with a current limit of, for example, 750 mA. Preemptively, as facilitated by a control device 120, or in response to an event, as explained above, the power supply 110 can reduce the current and/or voltage. In an embodiment, the power supply 110 is configured to preemptively reduce its output current to about 250 mA. In turn, the output voltage drops until the nodes collectively consume no more than said 250 mA. In this example, power supply 110 reduces its output to about 15V. These levels are still considered a logical one by the nodes 130, yet a node 130 that wishes to communicate by shorting the bus 140 need only short 250 mA (a safe current level for a DALI node) instead of 750 mA (an unsafe current level). Other nodes 130 may be configured to detect this low bus voltage and interpret it as a logical zero. In this manner, nodes 130 with a rectifier and capacitor at their input stage help the power supply 110 create two modes of operation: A high current delivery mode and a lower, safer mode for DALI devices.

Figure 6:
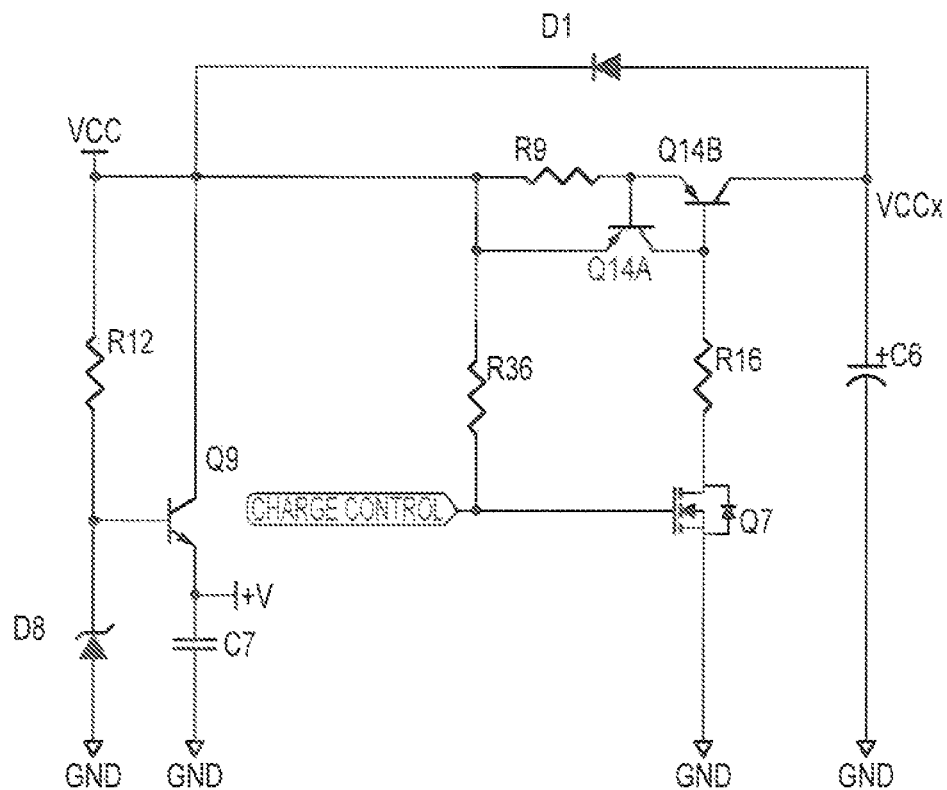
FIG. 6 illustrates an exemplary circuit for use in a DALI device according to various embodiments.

FIG. 6 illustrates an exemplary power supply circuit for a node 130 in accordance with various embodiments. In an embodiment, the power supply circuit 600 can electronically reduce the current draw for the node (to zero in some cases).

In operation, R12 biases D8 to generate a stable voltage at the base of Q9. Q9 acts as an emitter-follower and provides a stable supply voltage +V to the microcontroller of the node (not shown), while C7 filters the supply voltage. R9, Q14 and R16 form a constant current source which linearly charges C6. When the bus 140 is in the logical zero state, C6 supplies a stable voltage to the microcontroller via D1, R12, D8, Q9 and C7.

Q7 allows the current source to be turned on and off. R36 biases Q7 in the on-state. R16 allows base current through Q14B, turning it on, so that C6 can charge. Q14A monitors the charge current via R9 and limits it to approximately 0.7V divided by R9. Once the microcontroller has booted up, it can control the current source via the "Charge Control" output. Lowering this pin to GND turns Q7 off, which in turn turns Q14B off and thereby removes the charging current into C6.

In an embodiment, circuit 600 allows the current consumption of a group of DALI nodes 130 such that the nodes 130 collectively consume less than 250 mA if their supply voltage is below a certain voltage. The nodes 130 in an embodiment can thereby demonstrate similar behavior to nodes having a rectifier/capacitor input stage as described above. The power supply 110 can then be preemptively switched from a higher current limit to a lower current limit (here 250 mA), thereby protecting the DALI nodes which can only safely short the 250 mA current level or less.

In an embodiment, rather than activating the circuit 600 based on the node's supply voltage, the node can activate the circuit when other nodes are attempting to communicate. Similarly, control device 120 signals power supply 110 to switch to a lower current limit when other nodes 130 are attempting to communicate. Since nodes 130 have reduced their current consumption simultaneously by activating the circuit 600, the lower current limit of power supply 110 is temporarily sufficient to supply the required current. Any DALI node 130 that wishes to communicate is protected and is only required to short the 250 mA current level. Additionally, this allows groups of nodes to collectively alter their current draw to help facilitate communication between nodes at safe current levels, even if there is a relatively high level of impedance due to bus wiring.

Overcoming Issues Due to Bus Length

In addition to helping to expand the capacity of bus networks, embodiments according to this disclosure can help overcome issues associated with the impedance of the wiring in bus networks. In DALI bus networks, for example, as bus length increases the wiring impedance itself will begin to limit current (rather than the power supply coupled to the network), which in the event of a communication attempt by a node 130 can result in the inability of other nodes to recognize said communication attempts.

Designers of conventional DALI systems typically reduce the bus length, increase the wiring cross section, and/or reduce the number of devices on the bus to prevent the effects associated with high wiring impedance. The DALI standard requires that nodes monitor the bus voltage to detect communication (that is, <6.5V is logical zero, >11.5V represents a logical one). In a conventional DALI system with excessive wiring impedance, however, nodes may not be able to detect those levels when other nodes attempt to communicate and short the bus. For example, a long bus may have an impedance of 100 Ohms. Even if a device shorts the bus, the resulting current may be 165 mA using a typical DALI power supply. Since the current limit of 250 mA is not exceeded, no voltage drop occurs and no communication is visible to other nodes 130.

Embodiments of the present disclosure as described above, however, can help devices 130 detect communications between control devices 120 and nodes 130, and between the nodes 130 themselves, allowing for a variety of features to be implemented in a DALI network, even one with a relatively long bus length. For example, by allowing all nodes 130 on the bus 140 to see communications between other nodes 130 and a control device 120, communication collisions can be detected and avoided. For example, where node A has the same address as node B on the bus, they may both attempt to respond simultaneously to a communication from a control device. Embodiments of this disclosure allow the control device and both nodes to detect an attempted response by both devices and identify the source of the collision. This can be particularly advantageous during the initial setup of a bus network (when assigning addresses to all nodes on a bus) to identify nodes with duplicate addresses.

Embodiments of this disclosure can also aid in networks having bus arbitration and/or multiple control devices. In such systems, a bus arbiter may declare the bus free for asynchronous (event type) messages. Nodes then can initiate communication as in a multi-master situation but they must be able to detect whether another node already commenced transmission. Similarly, embodiments of the disclosure can aid in implementing priority communication schemes. For example, DALI supports a scheme where a window for prioritized messages is opened, with the higher the priority of the message the earlier in the window it must be transmitted. Embodiments of the disclosure aid in allowing the bus to be monitored such that lower priority messages are not transmitted later in the window if a higher priority transmission is already in progress. In other embodiments, nodes 130 may be configured to communicate synchronously with each other.

Figure 7:
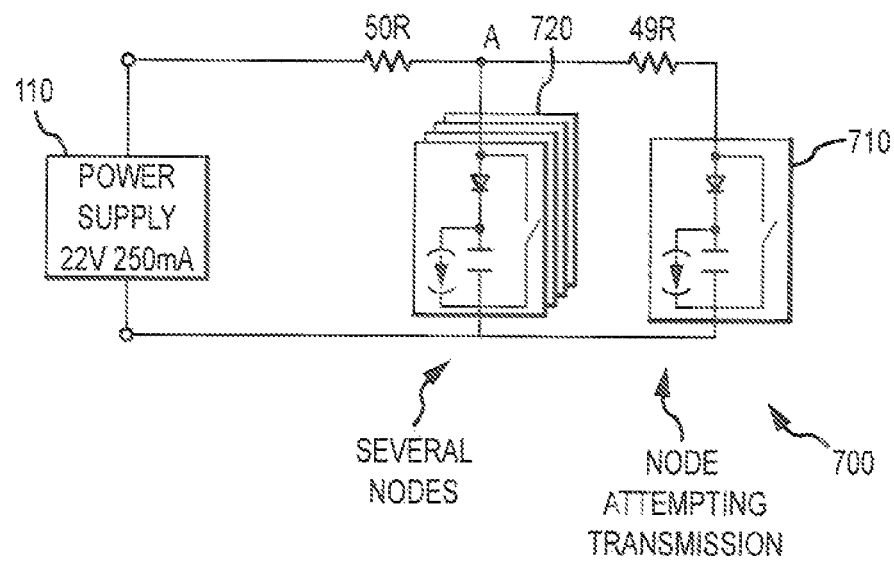
FIG. 7 depicts an exemplary bus in accordance with various embodiments.

FIG. 7 illustrates an exemplary case where a bus has a relatively high wiring impedance. In this case, an increase in current draw by a first device 710 can result in a decrease in current by other devices 720, without substantially affecting the current draw on the bus as detected by the power supply. In this example, a network is powered by a standard DALI bus of 22V with a 250 mA current limit. After 50 Ohm of wiring impedance, a group of devices 720 collectively consume 220 mA. After another 49 Ohm wiring impedance is an additional single device 710. The group of devices 720 have approximately 11V of supply voltage (reflected by an 11V drop across the 50 Ohm impedance), neglecting the draw of the right device. In this example, the group of devices 720 will have their respective capacitors charged to approx. 10.5V (11V less a diode drop), while the overall current draw of this bus network amounts to about 220 mA steady state.

If device 710 attempts to communicate, it shorts the bus, causing current flow through both the 50 Ohm and the 49 Ohm wiring impedance, and causing an additional drop across the 50 Ohm resistance. The voltage at junction A will drop and the group of devices 720 will have a higher voltage in their capacitors than supply voltage. Consequently, devices 720 will stop drawing current from the bus, and all current will flow through the device 710 shorting the bus. The current draw of this case amounts to 22V/99 Ohm=222 mA, which is very close to the "pre-short" condition and therefore making it difficult to determine when a device is attempting communication.

Embodiments of the present disclosure can help address the issues described above. In an embodiment, a control device 120 can be coupled to the power supply 110 to facilitate outgoing communication as described above. The current supplied by the power supply 110 is analyzed in order to detect a potential response to the control device 120 by the nodes 130.

Figure 8:
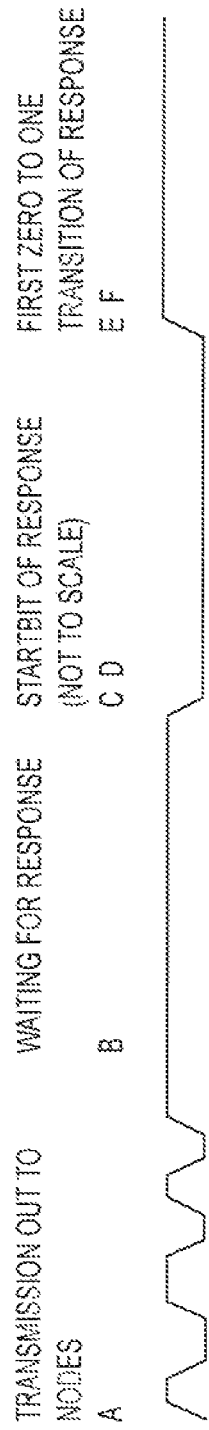
FIG. 8 illustrates a typical communications timing diagram for DALI devices.

The current drawn by the devices 130 can be detected in any suitable manner. For example, as described previously, the current may be measured and provided to a high pass filter, which filters out the slowly changing steady state current. The filter's output may be compared against a positive threshold and a negative threshold. Referring now to FIG. 8, which depicts a typical communications timing diagram for DALI devices, a rapid increase in current drawn by a device 130 will exceed the positive threshold, which must be lower than the current limit of a standard DALI power supply, and indicates a node's attempt to response (point C in FIG. 8). As the node releases the bus (point E in FIG. 8) the current will rapidly drop, thereby creating a negative pulse behind the high pass filter and triggering the negative threshold.

In an embodiment, when a device 130 shorts the bus 140, the incremental current is detected by the power supply 110, which additionally drops its output voltage, which can be detected by the devices 130 on bus 140 as an indicator of communication between devices 130. Once a device 130 releases its short, voltage will rise again, thereby appearing as a logical one to all devices 130 on the bus 140. Once the entire response has been transmitted by a device 130, as may be detected by a "bus idle timeout" or as may be evident by the command that had been sent, the power supply 110 can resume providing power at the original current limit.

This approach can be used to actively control the power supply's 110 voltage to make communication between two devices (120, 130) visible to other devices 130. If the power supply implements current fold-back, then changing its output voltage can automatically change its current limit as well. In alternate embodiments, the control device 120 need not necessarily be coupled to the power supply 110. Instead, the power supply can be configured to detected increases in current and either lower the voltage directly or indirectly by lowering the current limit, thereby allowing the communication to be visible by all nodes.

In embodiments of the disclosure, the power supply 110 and one or more devices 130 may cooperate to lower the overall current consumed by the devices 130 on the bus 140. In an embodiment, the power supply 110 is configured to lower its current limit to cooperate with devices 130 that have input stages which include a rectifier and capacitor (or other energy storage device), such as the device 500 shown in FIG. 5.

In an embodiment, when the control device 120 expects a response from a node 130, it indicates to the power supply 110 to preemptively lower the current limit by the power supply 110. Alternately, the power supply may be configured to lower its output voltage directly (i.e., without receiving an indicator from the control device 120) by detecting the current drawn by the devices 130. In either case, the power supply 110 lowers the bus voltage below the voltage in the nodes' 130 capacitors and they will stop drawing current, thereby satisfying the new current limit in the power supply 110. Because the capacitors are charged to the bus nominal "high voltage" (logical one), the newly established bus voltage is just under the nominal voltage, and thus the reduction of the current limit does not cause the bus voltage to drop significantly. Embodiments of this disclosure may be configured to operate at any suitable voltage level. In an embodiment, voltage levels are about 22.5V normally, well above the minimum voltage for a logical one on a DALI bus of 9.5V.

In an embodiment, the nodes 130 on the bus 140 may be configured to monitor all communication on the bus 140, and actively lower their current consumption whenever a response is expected. Nodes 130 performing this functionality need not have the rectifier/capacitor input stage described in FIG. 5, but can have any suitable design. For example the nodes 130 may include the opto-coupler input stage (shown in FIG. 4) that is commonly found in DALI nodes.

A device 130 may be configured to change its current draw in response to a command (e.g., received from the control device), a measured electrical characteristic (e.g., the voltage level of the power supplied by the power supply via the bus), a detected communication between other devices 130 on the bus, or any other suitable event.

In an example of an embodiment, referring again to FIG. 7, the group of devices 720 can collectively reduce their current consumption as described above. A control device (not shown) coupled to the power supply transmits a command that expects a response from device 710. In anticipation of the command, the group of devices 720 collectively lower their current consumption from 220 mA to 22 mA, for example. The power supply detects the reduction in current consumption from 220 mA to 22 mA, and, upon device 710 attempting to communicate, sees a rapid increase in current consumption to 222 mA. This increase in current consumption from 22 mA to 222 mA is easily detectable by both the power supply 110 and control device 120 (coupled to the power supply 110), allowing the current waveform to be interpreted and the node's 710 response retrieved.

In yet another example, referring again to FIG. 7, the power supply 110 can drop its current limit upon detection of a transmission attempt. In this example, after the group of devices 720 reduce their collective current consumption to 22 mA, and device 710 shorts the bus to create a logical zero, current increases to 222 mA. The power supply 110 detects the increase and lowers its current limit from 250 mA to 50 mA. The power supply 110 adjusts the output voltage in order to limit current to 50 mA, which will settle to about 5V (50 mA*99 Ohm). This allows the nodes 710, 720 to see and interpret the voltage as a logical zero, even in cases where there is significant impedance due to bus wiring. In order to return to a logical one, node 710 releases the short and the current drops. The power supply 110, detecting that it is no longer current limiting, reverts back to a 250 mA limit, causing the bus voltage to rise.

Due to the effects of high wiring impedance on the communication, the DALI standard specifies a maximum wiring impedance for the bus, that is, the longer the bus run, the higher the wire cross section (wire gauge) that must be used. However, this requires different types of wire depending on the length of a bus, in turn requiring more careful installations, more products to stock, etc. and also costlier wire. Embodiments of the present disclosure can provide significant advantages over conventional systems. For example, conventional DALI bus networks using 18 AWG wire are only capable of a maximum length of about 570 ft. In an embodiment according to aspects of this disclosure, by contrast, a DALI bus network may be implemented using 18 AWG wire (the minimum gauge under DALI requirements) of up to a length of about 1500 ft, and is capable of delivering sufficient power to more devices than the conventional 570 ft network.

The above-described embodiments may be implemented in any manner, such as through hardware, software, or a combination of the two. Functionality implemented through software may be performed by any suitable computer-based system. Such a software program may be stored on any computer-readable medium, such as floppy disks, hard disks, CD-ROMs, DVDs, any type of optical or magneti-optical disks, volatile or non-volatile memory, and/or any other type of media suitable for storing electronic instructions and capable of interfacing with a computing device. Methods according to embodiments of present invention may operate in conjunction with any type of computer system, such as a personal computer (PC), server, cellular phone, personal digital assistant (PDA), portable computer (such as a laptop), embedded computing system, and/or any other type of computing device. The computer system may include any number of computing devices connected in any manner, such as through a distributed network. The computer system may communicate and/or interface with any number of users and/or other computing devices to send and receive any suitable information in any manner, such as via a local area network (LAN), cellular communication, radio, satellite transmission, a modem, the Internet, and/or the like.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Furthermore, the connecting lines shown in the various figures are intended to represent exemplary functional relationships and/or physical couplings between the various elements. Many alternative or additional functional relationships or physical connections may be present in a practical system.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A communication system comprising:
an input comprising a positive terminal and a negative terminal to receive a continuous voltage from a voltage generator, wherein the input is coupled to an output comprising a positive terminal and a negative terminal;
a current regulator configure to limit the supply current provided by the voltage generator to the output to a maximum value;
a communication interface connected in parallel with the output, wherein the electrical impedance between the positive terminal and the negative terminal of the output is varied to transmit data; and
a control circuit configured to detect the output voltage between the positive terminal and the negative terminal of the output, and to vary the maximum value of the supply current provided by the voltage generator as a function of the detected output voltage.

2. The communication system of claim 1, wherein the voltage generator is configured to provide a continuous voltage, wherein the voltage generator is connected to the positive terminal and the negative terminal of the input.

3. The communication system of claim 1, wherein the control circuit is configured to compare the detected output voltage with a threshold, and in case the detected output voltage is greater that the threshold, to set the maximum value of the supply current provided by the voltage generator to the power output to a first value, and in case the detected output voltage is smaller than the threshold, to set the maximum value of the supply current provided by the voltage generator to the power output to a second value, wherein the second value is smaller than the first value.

4. The communication system of claim 1, wherein the communication interface is a transceiver.

5. The communication system of claim 4, wherein the communication interface is a Digital Addressable Lighting Interface.

6. The communication system of claim 1, wherein the current regulator is disposed between the positive terminal of the input and the positive terminal of the output.

7. The communication system of claim 1, wherein the current regulator comprises a measurement resistor configured to detect a voltage, which depends on the supply current provided by the voltage source, and wherein the current regulator is configured to limit the supply current provided by the voltage source as a function of the voltage detected by the measurement resistor.

8. The communication system of claim 7, wherein the control circuit is configured to vary the electrical resistance of the measurement resistor as a function of the detected output voltage.

9. The communication system of claim 1, further comprising:
- a device connected to the output, the device comprising a communication interface connected in parallel with the output, wherein the device is configured to be powered via the positive terminal and the negative terminal of the output.

10. A lighting system comprising:
- a communication system, comprising:
  - an input comprising a positive terminal and a negative terminal to receive a continuous voltage from a voltage generator, wherein the input is coupled to an output comprising a positive terminal and a negative terminal;
  - a current regulator configure to limit the supply current provided by the voltage generator to the output to a maximum value;
  - a communication interface connected in parallel with the output, wherein the electrical impedance between the positive terminal and the negative terminal of the output is varied to transmit data; and
  - a control circuit configured to detect the output voltage between the positive terminal and the negative terminal of the output, and to vary the maximum value of the supply current provided by the voltage generator as a function of the detected output voltage; and
- a power supply circuit configured to power a light source, wherein the power supply circuit comprises a communication interface connected in parallel with the output, and wherein the communication interface of the power supply circuit is configured to receive configuration parameters from the communication system and/or to transmit data that indicates the operation of the power supply circuit and/or the light source to the communication system.

11. The lighting system of claim 10, wherein the voltage generator is configured to provide a continuous voltage, wherein the voltage generator is connected to the positive terminal and the negative terminal of the input.

12. The lighting system of claim 10, wherein the control circuit is configured to compare the detected output voltage with a threshold, and in case the detected output voltage is greater that the threshold, to set the maximum value of the supply current provided by the voltage generator to the power output to a first value, and in case the detected output voltage is smaller than the threshold, to set the maximum value of the supply current provided by the voltage generator to the power output to a second value, wherein the second value is smaller than the first value.

13. The lighting system of claim 10, wherein the communication interface is a transceiver.

14. The lighting system of claim 13, wherein the communication interface is a Digital Addressable Lighting Interface.

15. The lighting system of claim 10, wherein the current regulator is disposed between the positive terminal of the input and the positive terminal of the output.

16. The lighting system of claim 10, wherein the current regulator comprises a measurement resistor configured to detect a voltage, which depends on the supply current provided by the voltage source, and wherein the current regulator is configured to limit the supply current provided by the voltage source as a function of the voltage detected by the measurement resistor.

17. The lighting system of claim 16, wherein the control circuit is configured to vary the electrical resistance of the measurement resistor as a function of the detected output voltage.

18. The lighting system of claim 10, wherein the communication system further comprises:
- a device connected to the output, the device comprising a communication interface connected in parallel with the output, wherein the device is configured to be powered via the positive terminal and the negative terminal of the output.

19. A method of operating a communication system, comprising:
- detecting a value indicative of an output voltage between a positive terminal and a negative terminal of an output, wherein the output is coupled to an input, wherein the input comprises a positive terminal and a negative terminal to receive a continuous voltage from a voltage generator;
- providing, by the voltage generator, a supply current to the output; and
- varying a maximum value of the supply current provided by the voltage generator as a function of the value indicative of the output voltage.

\* \* \* \* \*